United States Patent [19]
Thomson

[11] 3,715,371
[45] Feb. 6, 1973

[54] ADHESION PROMOTING AGENTS

[75] Inventor: J. Brent Thomson, Wilmington, Del.

[73] Assignee: Hercules Incorporated, Wilmington, Del.

[22] Filed: Nov. 16, 1971

[21] Appl. No.: 199,386

Related U.S. Application Data

[60] Division of Ser. No. 862,531, Sept. 30, 1969, which is a continuation-in-part of Ser. No. 789,974, Dec. 31, 1968.

[52] U.S. Cl......260/349, 260/448.2 N, 260/448.8 R, 260/29.2 N, 117/123 D, 156/326, 161/193
[51] Int. Cl. ....................C07d 117/00, C07d 103/02
[58] Field of Search .........260/349, 448.2 N, 448.8 R

[56] References Cited

UNITED STATES PATENTS 3,663,468    5/1972    Haluska............................260/448.2

Primary Examiner—John M. Ford
Attorney—John W. Whitson

[57] ABSTRACT

Disclosed are nitrogen containing silane compounds of the formula

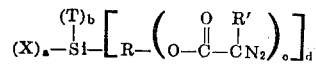

where R is an organic radical, X is selected from halo, hydroxy, alkoxy, aryloxy, organo oxycarbonyl, azido, amino, and amide radicals; T is selected from alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; where R' is selected from hydrogen, alkyl, cycloalkyl, aryl and —COOR'' radicals; where R'' is selected from alkyl, cycloalkyl, and aryl radicals.

2 Claims, No Drawings

ADHESION PROMOTING AGENTS

This is a division of application Ser. No. 862,531, filed Sept. 30, 1969, which in turn is a continuation-in-part of copending application Ser. No. 789,974, filed Dec. 31, 1968.

This invention relates to a new class of organic compounds. This invention further relates to a method of improving the adhesion of polymers to siliceous materials, metals, metal oxides and in adhering one polymer to another by use of the new organic compounds and to the products so produced.

It is known in the art to coat various substrates with polymers. However, in many cases the bond between the polymer and the substrate is weak. In still other cases the adhesion is almost completely lost when the polymer coated article is subjected to moist conditions.

It has now been found that the adhesion of any polymer to siliceous materials, metals, metal oxides or other polymer substrates can be greatly improved by the treatment of the substrate with a nitrogen containing silane compound having the general formula

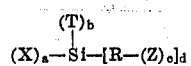

where R is an organic radical; X is selected from halo, hydroxy, alkoxy, aryloxy, organo oxycarbonyl, azido, amine, and amide radicals; T is selected from alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; and Z is selected from

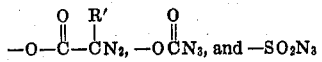

where R' is selected from hydrogen, alkyl, cycloalkyl, aryl, and —COOR'' radicals; where R'' is selected from alkyl, cycloalkyl and aryl radicals. Not only does the treatment in accordance with this invention increase the adhesion of the polymer to the substrate, it also greatly improves wet strength retention.

Any polymer can be bonded to a siliceous material, metal, metal oxide or another polymer with said silane compound in accordance with this invention. Exemplary of the polymers which can be so bonded are the hydrocarbon polymers including saturated, unsaturated, linear, atactic, crystalline or nonlinear amorphous polymers, copolymers, terpolymers, etc. as for example polyethylene, polypropylene, poly(4-methylpentene-1), polybutene-1, polystyrene, styrene--butadiene rubber, butyl rubber, natural rubber, polybutadiene, polyisobutylene, ethylene--propylene copolymer, cis-1,4-polyisoprene, ethylene--propylene--dicyclopentadiene terpolymer, etc. and blends of these polymers with each other. In addition, nonhydrocarbon polymers including the cellulose esters such as cellulose acetate butyrate, acetate rayon, cellulose partial alkyl ethers such as hydroxyethyl and hydroxypropyl cellulose; viscose rayon; polyesters such as poly(ethylene terephthalate), drying and nondrying alkyd resins, etc.; poly-(alkylene oxides) such as poly(ethylene oxide) and poly(propylene oxide), etc. poly(arylene oxides) such as poly(phenylene oxide), etc; the polyamides such as nylon, perlon-L, etc.; and poly(vinyl alkyl ethers) such as poly(vinyl methyl ether), etc.; vinyl chloride polymers containing at least 10 mole percent of vinyl chloride such as poly(vinyl chloride), vinyl chloride —vinyl acetate copolymers, vinyl chloride—vinylidene chloride copolymers, vinyl chloride—maleic anhydride copolymers, vinyl chloride—fumaric acid copolymers, vinyl chloride—vinyl acetal copolymers such as the vinyl chloride—vinyl butyral copolymers, vinyl chloride—vinylidene chloride—acrylonitrile terpolymers, vinyl chloride—vinyl acetate—maleic anhydride terpolymers etc.; chlorinated natural rubber; ethylene—vinyl acetate copolymers; poly(vinylidene chloride); vinylidene chloride—acrylonitrile copolymers; poly(ethyl acrylate); poly(ethyl methacrylate); polysulfone; epoxy resins; poly[3,3-bis(chloromethyl)oxetane]; polychloroprene; butadiene—acrylonitrile copolymers; butadiene—acrylonitrilef—styrene terpolymers; etc. can be bonded to the above-mentioned materials.

The materials or substrates to which the polymers may be bonded, as stated above, include siliceous materials such as glass, asbestos, sand, clay, concrete, stone, brick, ceramic materials, etc.; metals such as aluminum, cadmium, chromium, copper, magnesium, nickel, silver, tin, titanium, zinc, etc. and alloys of the metals such as brass, bronze, steel, nickel chrome, etc.; and including metals which have been surface treated with phosphates, chromates, etc.; metal oxides such as aluminum oxide, iron oxides, lead oxides, titanium dioxide, zinc oxide, etc.; and other polymers. By the term "other polymers" is meant any polymer other than the polymer which is to be bonded. These materials to which the polymers may be bonded can be in various forms such as sheets, plates, blocks, wires, cloth, fibers, particles, powders, etc. For example, in accordance with this invention a polymer can be bonded to glass fibers, cord, plates, or cloth, asbestos sheets or fibers, siliceous fillers such as silicon dioxide (sand) or clay, metal sheets, plates or wires, metal oxide pigments, polymer sheets, woven fabric, fibers, etc.

The process of this invention can be carried out in various ways. For example the material or substrate can be coated with a solution of the silane compound and allowed to dry thus inducing bonding through the silyl group. A polymer can be bonded to the thus treated material at the decomposition temperature of the azide or diazo group. By another method the silane compound and polymer can be deposited together on the material and then heated to the decomposition temperature of the azide or diazo group. By still another method a polymer can be treated with the silane compound so as to react the azide or diazo functional group under conditions such that silane condensations do not occur. Subsequently the material or substrate can be contacted with the thus treated polymer so that coupling occurs through the silyl group. No matter which method is used it will be necessary, in accordance with this invention, to heat the silane compound to initiate the bonding reaction through the azide or diazo group. The temperature at which bonding is effected can be varied over a wide range depending upon the specific silane compound employed. In general, however, the temperature will be in the range of from about 70°C. to about 350°C. Various amounts of silane compound can be used depending upon the specific compound, the surface area to be covered, the polymer to be bonded to the material, etc. In general the silane compound will be employed in the form of a solution which can be sprayed, brushed, or poured over the surface of the material. Alternatively, the material or substrate can be dipped into a solution or emulsion of the silane compound. These new compounds are generally soluble in solvents such as methylene chloride, ethylenedichloride, trichloroethylene, perchloroethylene, methanol, ethanol, isopropyl alcohol, acetone, methyl ethyl ketone, benzene, toluene, etc. and will generally be used in concentrations of from about 0.01 percent to about 20.0 percent more preferably from about 0.05 percent to about 5.0 percent by weight.

In one modification of this invention the nitrogen containing silane compounds can be used to bond various types of reinforcing materials, such as fibers, yarn, cord, fabric, and the like to polymer (rubber) stock. A typical example of bonding reinforcing material is the bonding of poly(ethylene terephthalate) tire cord to rubber tire stock. The said polyester tire cord is first treated with the silane compound. This can be accomplished by contacting the cord with a nitrogen containing silane compound as for example, by dipping, spraying, brushing, or running it over a coated roll with a solution or dispersion of the silane compound in a suitable liquid. In the next step the thus treated cord is heated to a temperature sufficient to decompose the azide or diazo functional group. In so doing, it is believed the azide or diazo group reacts with the polyester leaving the silyl group free for later reaction. Next, the treated cord may be dipped in a standard industrial coating (adhesive) which is compatible with the rubber in which the cord is to be embedded. The coating is a conventional tire cord adhesive essentially comprising a mixture of a phenol-aldehyde resin and a rubber latex. If desired, the dip in the conventional tire cord adhesive can be omitted with a proportionate decrease in adhesive strength. Finally, the thus treated tire cord is embedded in a commercial vulcanizable tire stock and cured. While polyester tire cord is recited above, various other synthetic fibers, cords, fabrics, and the like can be bonded to rubber stock in accordance with this invention. Such other reinforcing materials include polyolefin, polyamide, polycarbonate, rayon and glass fibers, cords, fabrics and the like. In the case of bonding glass reinforcing material to rubber tire stock, the heat treatment following the contacting with a nitrogen containing silane compound (described above) may not be required because it is believed the silyl groups react with the glass leaving the azide or diazo functional groups free for later reaction.

In another modification of this invention, metal objects, such as metal cans can be treated with a solution of the silane compound, coated with a polymer latex or dispersion and then heated to form a tightly bonded, impervious coating. It will be readily apparent to those skilled in the art that the process of this invention lends itself to any occurrence where polymers are to be bonded to siliceous materials, metals, metal oxides or other polymers.

In addition to the above modification of this invention, the nitrogen containing silane compounds can be used to cross-link polymers. Cross-linking can be carried out by merely admixing the polymer with a small amount of silane compound and any well known basic or acidic condensation catalyst. Typical of such catalysts are hydrochloric acid, hydrobromic acid, acetic acid, sodium hydroxide, ammonium hydroxide and the like. In the presence of water and at higher temperatures cross-linking may occur without the addition of a condensation catalyst. In cross-linking it is believed the azide or diazo functional groups react with the polymers while the silyl groups condense, thus forming bonds between polymer chains.

The nitrogen containing silane compounds of this invention, as stated above, have the general formula

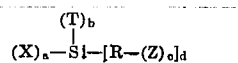

where X, T, R, Z, $a$, $b$, $c$, and $d$ are defined as above. Generally R will be selected from the group consisting of the hydrocarbon, halo-substituted hydrocarbon, hydrocarbon-oxy-hydrocarbon, hydrocarbon-thio-hydrocarbon and hydrocarbon-sulfonyl-hydrocarbon divalent radicals. In preferred embodiments of this invention R will be a divalent organic radical selected from the group consisting of alkylene radicals such as the straight and branched $C_1$–$C_{20}$ alkylene radicals which include, for instance, the methylene, ethylene, trimethylene, tetramethylene, pentamethylene, hexamethylene, octamethylene, decamethylene, dodecamethylene, octadecamethylene, etc. radicals; cycloalkylene radicals such as the $C_3$–$C_{20}$ cycloalkylene radicals which include, for instance, the cyclohexylene, cyclopentylene, cyclooctylene, cyclobutylene, etc. radicals; arylene radicals such as o—, m—, and p-phenylene, naphthylene, biphenylene, etc. radicals; arylene-dialkylene radicals, such as o—, m—, and p-xylylene diethylene, o—, m—, and p-phenylene diethylene, etc. radicals; alkylene-diarylene radicals such as methylene bis (o—, m—, and p-phenylene), ethylene bis(o—, m—, and p-phenylene), etc. radicals; cycloalkylene-dialkylene radicals such as, 1,2—, 1,3— and 1,4-cyclohexane-dimethylene, 1,2— and 1,3— cyclopentane dimethylene, etc. radicals; and the alkylene-oxyalkylene radicals, arylene-oxy-arylene radicals, alkarylene-oxy-arylene radicals, alkarylene-oxy-alkarylene radicals, aralkylene-oxy-alkylene radicals, aralkylene-oxy-aralkylene radicals, etc. as well as the corresponding thio and sulfonyl radicals, specific examples of which include ethylene-oxy-ethylene, propylene-oxybutylene, phenylene-oxy-phenylene, methylenephenylene-oxy-phenylenemethylene, phenylenemethylene-oxy-methylenephenylene, ethylene-thio-ethylene, phenylene-thio-phenylene, phenylenemethylene-thio-methylenephenylene, butylene-sulfonyl-butylene, etc. radicals. It will, of course, be obvious to those skilled in the art that R can contain other functional groups, which are substantially inert to the reactions in which these compounds are used, such as esters, sulfonate esters, amides, sulfonamides, urethanes, and the like. In general R' can be hydrogen, alkyl, cycloalkyl, aryl or —COOR" radicals. The most preferred alkyl, cycloalkyl and aryl radicals are methyl, ethyl, propyl, butyl, isobutyl, cyclohexyl, cycloheptyl, phenyl, tolyl, etc. The radical R" can be alkyl, cycloalkyl, or aryl with the most preferred radicals being methyl, ethyl, propyl, butyl, isobutyl, cyclohexyl, cycloheptyl, phenyl, tolyl, etc. In general X can be hydroxy or any hydrolyzable radical. Typical hydrolyzable radicals are the halo radicals which include, for instance, the fluoro, chloro, bromo and iodo radicals, the alkoxy radicals including the $C_1$-$C_{20}$ straight and branched chain alkoxy radicals such as methoxy, ethoxy, propoxy, butoxy, isobutoxy, octadecyloxy, etc.; the aryloxy radicals such as phenoxy, etc.; the organo oxycarbonyl radicals including the aliphatic oxycarbonyl radicals such as acetoxy, propionyloxy, stearoyloxy, etc.; the cycloaliphatic oxycarbonyl radicals such as cyclohexylcarbonyloxy, etc.; the aromatic oxycarbonyl radicals such as benzoyloxy, xylyloxy, etc.; the azido radical; the amine radical; the substituted amine radicals such as ethylamine, diethylamine, propylamine, etc.; and the amide radicals such as formamide, acetamide, trifluoroacetamide, benzamide, etc. Generally T will be a radical selected from the group consisting of alkyl, cycloalkyl, aryl, alkaryl, and aralkyl radicals such as methyl, ethyl, propyl, isopropyl, butyl, hexyl, cyclohexyl, cycloheptyl, phenyl, tolyl, benzyl, xylyl, etc.

Typical nitrogen containing silane compounds of this invention are 3-(trimethoxysilyl)propyl diazoacetate, 2-(methyldichlorosilyl)ethyl diazoacetate, p-(trimethoxysilyl)benzyl diazoacetate, 10-[(3-trimethoxysilylpropyl)carbamoyl]decyl diazoacetate, 4-(trimethoxysilyl)butyl α-diazopropionate, 3-(ethyldimethoxysilyl)propyl α-diazo- α-phenylacetate, 3-(trichlorosilyl)propyl α-diazo- α-carbomethoxyacetate, 2-(trimethoxysilyl)ethyl α-diazo-α-carbophenoxyacetate, 4-(ethoxydichlorosilyl)cyclohexyl diazoacetate, 3-(trimethoxysilyl)propyl azidoformate, 3-(methyldimethoxysilyl)propyl azidoformate, 2-chloro-3-[3-(trimethoxysilyl)propoxy]propyl azidoformate, 3-(triazidosilyl) propyl azidoformate, 2-(trimethoxysilyl)ethyl azidoformate, 3-(triacetoxysilyl)propyl azidoformate, 2-[3-(trimethoxysilyl)propoxy]ethyl azidoformate, 3-(methyldiacetosilyl)propyl azidoformate, 2-(ethyldipropionyloxysilyl)ethyl azidoformate, p-(trimethoxysilyl)phenyl azidoformate, 4-(diethoxychlorosilyl)butyl azidoformate, 4-(ethyldimethoxysilyl)cyclohexyl azidoformate, 3-(phenyldichlorosilyl)propyl azidoformate, 4-(trisdimethylaminosilyl)butyl azidoformate, 5-(trimethoxysilyl)amylsulfonyl azide, 4-(trimethoxysilyl)cyclohexylsulfonyl azide, 2-methyl-4-(trichlorosilyl)butylsulfonyl azide, 3-chloro-6-(trimethoxysilyl)hexysulfonyl azide, 6-(trimethoxysilyl)hexylsulfonyl azide, 2-(trichlorosilyl)ethylsulfonyl azide, 3-(dimethylaminodimethylsilyl)propylsulfonyl azide, 2-(triethoxysilyl)ethylsulfonyl azide, 3-(methyldimethoxysilyl)-propylsulfonyl azide, 3-(trimethoxysilyl)propylsulfonyl azide, 4-[diethoxy-(4-sulfonylazidobutyl)silyl]butylsulfonyl azide, p-(trimethoxysilyl)benzenesulfonyl azide, 2-(trimethoxysilyl)ethylbenzenesulfonyl azide, N-3-(triethoxysilyl)propyl-N'-3-azidosulfonylpropylurea, N-3-(triethoxysilyl)propyl-N'-m-azidosulfonylphenylurea, etc.

The nitrogen containing silane compounds of this invention can be prepared by various methods. The diazosilanes, for example, can be prepared by reacting the corresponding hydrochloride salt of the primary amine with nitrous acid (diazotization), which can be shown as follows:

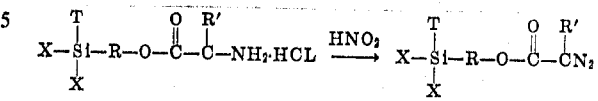

where T, X, R and R' are as defined above. The intermediate aminosilane can be prepared, for example, by the addition of the desired silane to an unsaturated ester of glycine as follows

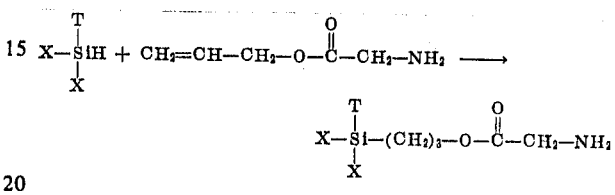

where T and X are as defined above. If desired the unsaturated ester of glycine can first be diazotized then reacted with the desired silane as follows:

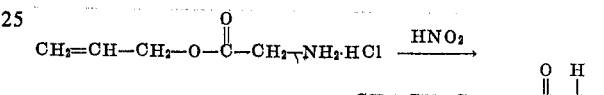

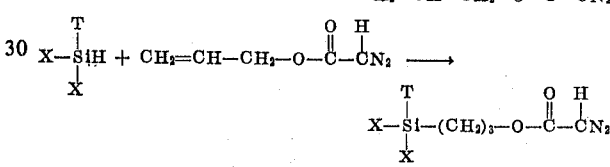

where T and X are as defined above. Still another method for the preparation of the diazosilanes is the reaction of a hydroxy diazoacetate with a silaneisocyanate as follows:

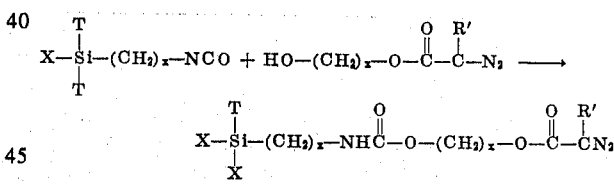

where T, X and R' are as defined above and x is greater than 1.

The azidosilane compounds, for example, can be prepared by reacting the corresponding chloro-substituted compound with an alkali metal azide. In the preparation of an azidoformate the reaction can be shown as follows:

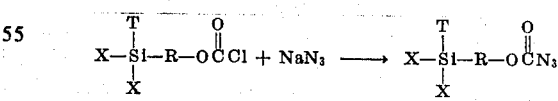

where T, X, and R are as defined above. The intermediate silane chloroformate can be prepared, for example, by the addition of the desired silane to an unsaturated chloroformate as follows:

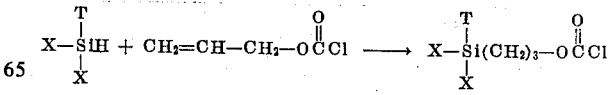

where T and X are as defined above, or an epoxysilane can be reacted with phosgene as follows:

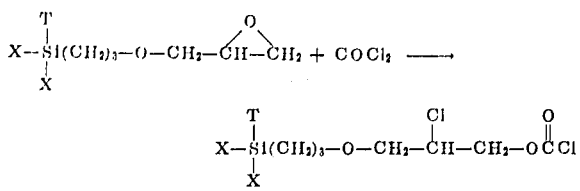

where T and X are as defined above. In the case of a sulfonyl azide the intermediate silanesulfonyl chloride can be prepared for example by the addition of the desired silane to an unsaturated sulfonyl chloride as follows:

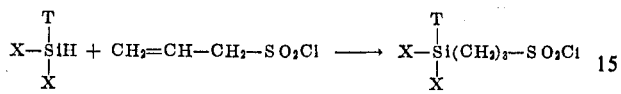

where T and X are as defined above, or an alkylsilane can be chlorosulfonated as follows:

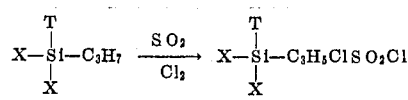

where T and X are as defined above. It should be noted that a mixed reaction product may be obtained from chlorosulfonation, since substitution is random along the alkyl chain and there will usually be some chlorination of the alkyl chain. Another method for the preparation of the azidosilanes is by reacting a compound containing the azido group with a compound containing the silane. In the case of sulfonyl azides an organoaminosilane can be reacted with a compound containing both a sulfonyl azide group and an isocyanate group as follows:

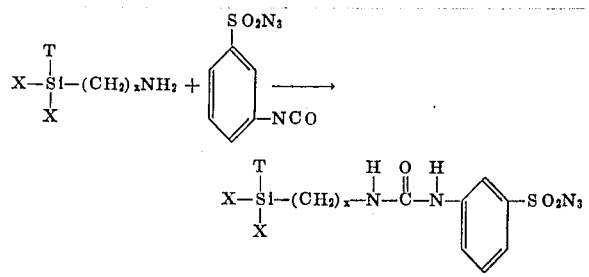

where T and X are as defined above and x is greater than 1.

Many of the nitrogen containing silane compounds of this invention are liquids, that is liquid at 20°–25°C. and at atmospheric pressure. However, some are solids. They are characterized in that the diazo or azido portion readily reacts with a wide variety of polymers to effect linkage of the polymer to the silane compound. They are further characterized in that the silane portion of the molecule adheres to materials such as siliceous materials, metals, metal oxides and many polymers.

The above described nitrogen containing silane compounds readily condense to form dimers, trimers and even polymers when heated and/or in the presence of water and acidic or basic condensation catalysts. Because of the case with which they condense, it is apparent that many of the silane compounds of this invention (with the exception of those freshly prepared under anhydrous conditions) exist in admixture with at least a small amount of their condensation products. Therefore, it is to be understood that the terms "-nitrogen containing silane compound " and "silane compound", used in the specification and claims of this application, include not only the pure monomeric compounds but also mixtures of the monomers with at least a small amount of the condensation products of the monomers. It may be desirable in some cases to use a condensation product of a nitrogen containing silane compound instead of the monomer. If this is desired such condensation product can readily be prepared by heating one of the above described silane compounds in the presence of a small amount of water and a conventional condensation catalyst, i.e. acetic acid, HCl, HBr, NaOH, NH$_4$OH, or the like. A typical dimer would have the general formula

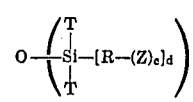

where T, R, Z, c and d are as defined above. A typical condensation polymer would have the general formula

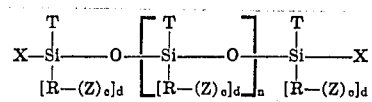

where X, T, R, Z, c and d are as defined above.

The following examples will illustrate the invention all parts and percentages being by weight unless otherwise indicated.

EXAMPLE 1

This example illustrates N-3-(triethoxysilyl)propyl-N'-m-azidosulfonylphenylurea, and a process for its preparation.

To a solution of 15 parts of m-azidosulfonylphenyl isocyanate in 150 parts of benzene at room temperature was added dropwise 14.8 parts of 3-aminopropyltriethoxysilane with stirring. As the triethoxysilane was added, a white needlelike solid began to form. The addition of 25 parts of methylene chloride resulted in a clear solution. After stirring overnight the solvent was evaporated leaving a yellow solid having a melting point of 80°–95°C.

An infra-red spectrum of this product showed a strong azide band at 2,130 cm.$^{-1}$ and a strong carbonyl band at 1,700 cm.$^{-1}$. A sample of the product decomposed in diphenyl ether at 153°C. evolving 92 percent of the theoretical amount of gas.

A typical elemental analysis of this product was:

|  | N | S | Si |
|---|---|---|---|
| Analyzed (%) | 14.6 | 7.3 | 6.2 |
| Calculated (%) | 15.7 | 7.2 | 6.4 |

A sample of the product recrystallized from a mixed benzenehexane solvent was white and melted at 95°–97 °C.

EXAMPLE 2

This example illustrates 3-(methyldimethoxysilyl)propyl azidoformate and a process for its preparation.

To a solution of methyldichlorosilane (115 parts) and allyl chloroformate (60 parts) was added chloroplatinic acid (0.0052 parts) dissolved in isopropanol (0.1 parts). The mixture thus formed was stirred at 20°–25°C. under nitrogen for about 144 hours. Volatiles were removed by aspirator vacuum from the reaction mixture. Subsequently the reaction mixture was vacuum distilled. A middle cut (35 parts) boiling at 65°–68°C. at a pressure of 0.4 millimeter of mercury was collected as the desired intermediate product. It consisted essentially of 3-(methyldichlorosilyl)propyl chloroformate.

A portion (21 parts) of this intermediate product was added to a slurry of sodium azide (46.2 parts) in anhydrous methanol (150 parts). The resulting mixture was stirred rapidly in a nitrogen atmosphere for about 144 hours at 20°–25°C. The reaction mixture was placed under aspirator vacuum to remove solvent. The residue, a pasty solid, was extracted with methylene chloride. The colorless extract solution was subjected to vacuum to remove substantially all of the solvent. The residue was a colorless oil (37.6 parts) consisting essentially of 3-(methyldimethoxysilyl)propyl azidoformate.

A typical elemental analysis of this product was

|  | N | Si | Cl |
|---|---|---|---|
| Analyzed (%) | 16.2 | 12.1 | 0.1 |
| Calculated (%) | 18.0 | 12.0 | 0 |

EXAMPLE 3

This example illustrates 3-(trimethoxysilyl)propyl axidoformate and a process for its preparation.

To a solution of trichlorosilane (67.5 parts) and allyl chloroformate (30 parts) was added a solution of chloroplatinic acid (0.0052 part) in isopropanol (0.1 parts). The resulting mixture was stirred for 45 hours at 20°–25C. It was then subjected to vacuum distillation, the fraction distilling at 48°–50°C. at a pressure of 0.35 millimeter of mercury being collected as the desired intermediate product (28 parts). This product consisted essentially of 3(trichlorosilyl)propyl chloroformate.

This intermediate product (23 parts) was added dropwise to a slurry of sodium azide (39 parts) in anhydrous methanol (100 parts) while maintaining the reaction mixture thus formed at 20°–25°C. After stirring at this temperature in a nitrogen atmosphere for 20 hours, the reaction mixture was sparged with nitrogen and then stripped by aspirator vacuum of solvent. The white pasty residue was extracted with methylene chloride, the solids-liquid separation being achieved by centrifugation and decantation. The remaining solids were extracted two more times with fresh methylene chloride with the resulting methylene chloride extracts being combined with the first methylene chloride extract. The total methylene chloride extract was subjected to aspirator vacuum and then high vacuum (0.5 millimeter of mercury) at 20°–25°C. The residue was a colorless liquid (19.9 parts) consisting essentially of 3-(trimethoxysilyl)propyl azidoformate.

An infra-red spectrum of this product showed a strong azide doublet at 2,140 cm.$^{-1}$ and 2,180 cm.$^{-1}$, and a strong carbonyl band at 1,740 cm.$^{-1}$.

A typical elemental analysis of this product was:

|  | N | Si | Cl |
|---|---|---|---|
| Analyzed (%) | 16.6 | 10.1 | 0.81 |
| Calculated (%) | 16.8 | 11.2 | 0 |

EXAMPLE 4

This example illustrates 2-chloro-3-[3-(trimethoxysilyl)propoxy]propyl azidoformate, and a process for its preparation.

Liquid phosgene (20 parts) was added to a flask containing pyridine (1 part) at −60°C. The resulting yellow slurry was warmed to −15°C. and 3-glycidoxypropyl trimethoxysilane (23.6 parts) added dropwise over a 30 minute period. The yellow reaction mixture was stirred for 1.5 hours at −15° to −10°C., and then placed in a wet ice bath (+3°C.) under a very slow nitrogen sparge. The wet ice bath was allowed to warm to 20°–25°C. over a period of 16 hours. The resulting reaction mixture (a tan colored slurry) was sparged with nitrogen and then subjected to high vacuum at 20°–25°C. The residue was a light amber oil containing a small quantity of white solids. The solids were separated from the oil by centrifugation, to give the desired intermediate product (29 parts). This intermediate product consisted essentially of 2-chloro-3-[3-trimethoxysilyl)propoxy]propyl chloroformate.

A portion (13.4 parts) of the intermediate product was added dropwise to a slurry of sodium azide (7.8 parts) in anhydrous methanol (100 parts) maintained at 20°–25°C. The resulting reaction mixture was stirred for 20 hours at 20°–25°C. under nitrogen. The white slurry thus obtained was stripped under aspirator vacuum and then extracted with methylene chloride. The extract was subjected to high vacuum at 20°–25°C. to remove substantially all of the solvent. The resulting product was an oil (12.5 parts), consisting essentially of 2-chloro-3-[3-(trimethoxysilyl)propoxy]-propyl azidoformate.

The infra-red spectrum of this product showed a strong azide doublet at 2,140 cm.$^{-1}$ and 2,185 cm.$^{-1}$ as well as a carbonyl band at 1,740 cm.$^{-1}$.

A typical elemental analysis of the product was:

|  | N | Si | Cl |
|---|---|---|---|
| Analyzed (%) | 11.6 | 7.7 | 10.8 |
| Calculated (%) | 12.3 | 8.2 | 10.4 |

EXAMPLE 5

This example illustrates 3(triazidosilyl)propyl azidoformate and a process for its preparation.

Liquid sulfur dioxide (40 parts) was collected in a dry ice-acetone bath, warmed to −20°C., and sodium azide (3.25 parts) admixed with it. While stirring the resulting white slurry at −10°C., a portion (2.56 parts) of 3-(trichlorosilyl)propyl chloroformate was added. The reaction mixture thus formed was stirred at −10°C. for 3 hours and then allowed to slowly warm to 20°–≅°C. while passing a stream of nitrogen through the reaction mixture and evaporating excess sulfur dioxide. Methylene chloride (60 parts) was added to the remaining white solid material, and the mixture was then centrifuged to remove insoluble material. The solution was then stripped of methylene chloride by sparging with a stream of nitrogen until a constant weight was reached. The material that remained was a colorless oil (2.49 parts) consisting essentially of 3-(triazidosilyl)propyl azidoformate.

The infra-red spectrum of the oily product displayed a strong azide band at 2,160 cm.$^{-1}$ as well as a carbonyl band for the azidoformate at 1,730 cm.$^{-1}$ The azide content of the oil analyzed 59.2 percent. The calculated azide content for 3-(triazidosilyl)propyl azidoformate is 59.5 percent.

EXAMPLE 6

This example illustrates mixed isomers of chlorinated (trimethoxysilyl)amylsulfonyl azide and a process for their preparation.

Amyltrichlorosilane (41 parts) in carbon tetrachloride (250 parts) containing pyridine (0.5 part), was exposed to ultraviolet light while sulfuryl chloride (48.5 parts) was added dropwise over a period of 1 hour. The temperature was maintained at 25°-30°C. during the addition. The mixture thus formed was stirred for 7 hours at 25°-30°C. with continued exposure to ultraviolet light. A slightly cloudy solution resulted. Volatiles were removed from the solution by heating to 90°C. at atmospheric pressure, and then subjecting it to high vacuum at 20°-25°C. The product that remained was an amber oil (54 parts) consisting essentially of mixed isomers of chlorinated (trimethoxysilyl)amylsulfonyl chloride.

A portion (45 parts) of the intermediate product was added dropwise to a slurry of sodium azide (57 parts) in anhydrous methanol (300 parts) maintained at 20°-25C. The resulting reaction mixture was stirred at 20°-25C. for 20 hours, and then the methanol removed at this temperature by aspirator vacuum. The residue was a reddish tan pasty solid material. It was diluted with methylene chloride and the solids removed by centrifugation. The yellow solution remaining was subjected, at 20°-25°C., to a vacuum of 0.5 millimeter of mercury to remove the methylene chloride. The residue was a yellow oil (39.4 parts) consisting essentially of mixed isomers of chlorinated(trimethoxysilyl)amylsulfonyl azide.

The infra-red spectrum of the product in methylene chloride shows an azide band at 2,145 cm.$^{-1}$, and sulfonyl bands at 1,370 cm.$^{-1}$ and 1,190 cm.$^{-1}$.

A typical isomer contains one chloride on the amyl chain and one sulfonyl azide group also on the amyl chain.

EXAMPLE 7

This example illustrates mixed isomers of (trimethoxysilyl)hexylsulfonyl azide and a process for their preparation.

A solution of n-hexyltrichlorosilane (102 parts) in methylene chloride (1,200 parts) was cooled to 3°C. Sulfur dioxide gas was bubbled through the solution at a rate of about 9 parts per hour for about 10 minutes. Chlorine gas (25 parts) was then introduced in conjunction with the sulfur dioxide gas over a 5 hour period into the reaction mixture at 5°C. while exposing to ultra-violet light. The solvent was removed by aspirator vacuum from the chlorosulfonated reaction mixture. The resulting pale yellow solution was subjected to vacuum distillation up to 65°C. at 0.5 millimeter of mercury to remove unreacted n-hexyltrichlorosilane. The oily residue (345 parts) was an intermediate product consisting essentially of mixed isomers of (trimethoxysilyl)hexylsulfonyl chloride.

A quantity (159 parts) of the intermediate product was added dropwise to a slurry of sodium azide (195 parts) in anhydrous methanol (850 parts) while maintaining the temperature at 20°-25°C. After stirring the reaction mixture at this temperature for about 20 hours, the pink slurry was sparged with nitrogen and then stripped by aspirator vacuum of solvent. Benzene (450 parts) was admixed with the reaction mixture and the thus diluted mixture filtered. The filtrate was washed with fresh benzene (250 parts) and the wash liquid and filtrate combined to give a clear colorless solution (800 parts). This solution was stripped of benzene at 35°C. at 0.5 millimeter of mercury. The residue was a colorless oil (142 parts) consisting essentially of mixed isomers of (trimethoxysilyl)hexylsulfonyl azide.

An infra-red spectrum of the product showed an azide band at 2,130 cm.$^{-1}$ as well as sulfonyl peaks at 1,365 cm.$^{-1}$ and 1,160 cm.$^{-1}$.

A typical elemental analysis of the product was:

|  | N | S | Total Cl |
|---|---|---|---|
| Analyzed (%) | 12.8 | 9.7 | 2.6 |
| Calculated (%) | 13.5 | 10.3 | 0 |

The small amount of chlorine found in the analysis of the product indicates that the hexyl chain was partially chlorinated.

EXAMPLE 8

This example illustrates mixed isomers of (trimethoxysilyl)cyclohexylsulfonyl azide and a process for their preparation.

A solution of cyclohexyltrichlorosilane (100 parts) in methylene chloride (1,200 parts) was cooled to 3°C. and sulfur dioxide gas bubbled into the solution at a rate of 11.8 g. per hour for a period of about 15 minutes. While exposing the reaction mixture to ultraviolet light, chlorine gas (32.5 parts) was introduced into the reaction mixture in conjunction with the sulfur dioxide gas over a period of about 5 hours. Upon completion of the introduction of chlorine gas, exposure of the reaction mixture to ultra-violet light was continued for an additional 30 minutes. The solvent was removed from the clear solution under aspirator vacuum and then unreacted material was removed by distillation at 40°C. and pressure of 0.5 millimeter of mercury. The yellow oily residue (66 parts) consisted essentially of mixed isomers of (trichlorosilyl)cyclohexylsulfonyl chloride.

This intermediate product (60 parts) was added dropwise to a slurry of sodium azide (74 parts) in anhydrous methanol (500 parts). The resulting mixture was stirred at 20°-25°C. in a nitrogen atmosphere for 20 hours. After removal of methanol by aspirator vacuum, benzene (300 parts) was admixed with the reaction mixture and the resulting slurry centrifuged to remove insolubles. The liquid that remained was a clear pale yellow solution. By subjecting the solution to a vacuum of 0.5 millimeter of mercury at a temperature of about 30°C., the benzene was stripped from the solution, giving a yellow oily product (45.5 parts) consisting essentially of mixed isomers of (trimethoxysilyl)cyclohexylsulfonyl azide.

An infra-red spectrum of the product showed a strong azide peak at 2,145 cm.$^{-1}$ and sulfonyl bands at 1,370 cm.$^{-1}$ and 1160 cm.$^{-1}$.

A typical elemental analysis of the product was:

|  | N | S | Si | Total Cl |
|---|---|---|---|---|
| Analyzed (%) | 11.6 | 8.6 | 8.9 | 3.1 |
| Calculated (%) | 13.6 | 10.3 | 9.05 | 0 |

The small amount of chlorine found in the analysis of the product indicates that the cyclohexyl ring was partially chlorinated.

EXAMPLE 9

This example illustrates 3(trimethoxysilyl)propyl diazoacetate and a process for its preparation.

A mixture of glycinyl chloride hydrochloride (13 parts) and allyl alcohol (11.6 parts) was heated under an atmosphere of nitrogen for 2 hours at 90°C. The resulting mixture was extracted thoroughly with ether to remove excess allyl alcohol and the remaining insoluble material dissolved in water (50 parts). Ether (180 parts) was added to the aqueous solution and sodium nitrite (6.9 parts) dissolved in the aqueous layer while maintaining the temperature at 0°C. Then 10 percent sulfuric acid was added dropwise until the ether layer became bright yellow. The ether layer was separated from the aqueous layer and dried over a mixture of anhydrous sodium sulfate and anhydrous sodium carbonate. The drying agents were filtered off and the ether removed under vacuum. The yellow oily residue consisted essentially of allyl diazoacetate.

A portion of the intermediate product (5 parts), along with trimethoxysilane (12.2 parts) and a catalytic amount of azo bis-isobutyronitrile were dissolved in benzene (175 parts) and heated for 16 hours at 50°C. The benzene and excess silane were then removed under vacuum. The yellow oily residue consisted of 3(trimethoxysilyl)propyl diazoacetate in substantial yield.

EXAMPLE 10

This example illustrates mixed isomers of 3- and 4-(trimethoxysilyl)cyclohexyl diazoacetate and a process for their preparation.

A mixture of glycinyl chloride hydrochloride (9 parts) and 3-cyclohexene-1-ol (14.7 parts) was heated under an atmosphere of nitrogen for 2 hours at 100°C. The resulting mixture was extracted thoroughly with ether and the remaining insoluble material dissolved in water (40 parts). Ether (140 parts) was added to the aqueous solution and sodium nitrite (4.76 parts) dissolved in the aqueous layer while cooling the whole to a temperature of 0°C. Then 10 percent sulfuric acid was added dropwise until the ether layer became bright yellow. The ether layer was separated and dried as described in Example 9. The drying agents were filtered off and the ether removed under vacuum. The remaining yellow oil consisted essentially of 3-cyclohexene-1-diazoacetate.

A portion of the intermediate product (4.2 parts), along with trimethoxysilane (12.2 parts) and a catalytic amount of azo bis-isobutyronitrile were dissolved in benzene (175 parts) and heated for 14 hours at 50°C. The benzene and excess silane were then removed under vacuum. The yellow oily residue consisted essentially of 3 and 4-(trimethoxysilyl)cyclohexyl diazoacetate in substantial yield.

EXAMPLE 11

This example illustrates p-[3-(trimethoxysilyl)propyl] phenyl diazoacetate and a process for its preparation.

Glycinyl chloride hydrochloride was reacted with 3-(p-hydroxyphenyl)-1-propene and then diazotized using the process described in Examples 9 and 10.

The resulting intermediate (9.1 parts), along with trimethoxysilane (12.2 parts) and a catalytic amount of azo bis-isobutyronitrile were dissolved in benzene (130 parts) and heated for 15 hours at 50°C. The benzene and excess silane were removed under vacuum. The yellow oily residue consisted essentially of p-[3-(trimethoxysilyl)propyl]phenyl diazoacetate in good yield.

EXAMPLE 12

This example illustrates 10-[(3-trimethoxysilylpropyl) carbamoyl]decyl diazoacetate and a process for its preparation.

To melted 1,10-decanediol (35 parts) at 125°C. was added glycinyl chloride hydrochloride (11.24 parts) portionwise under an atmosphere of nitrogen over a one hour period with stirring. The resulting mixture was heated under nitrogen for 2 hours at 120°C. Water (500 parts) was added and the mixture stirred 4 hours. It was then extracted four times with portions of chloroform (300 parts). The aqueous layer was filtered and evaporated to dryness to give an orange gummy solid. The solid was extracted with ether and dissolved in water (100 parts). Ether (210 parts) was added to the resulting yellow aqueous solution and the mixture cooled to 0°C. Sodium nitrite (50 parts) was dissolved in the aqueous layer and 10 percent sulfuric acid added dropwise. With the addition of acid the ether layer became yellow and was periodically drawn off and replaced with fresh ether. The combined ethereal extracts (850 parts) were dried as described in Example 9. The drying agents were filtered off and the ether removed under vacuum. The remaining yellow oil (6.4 parts) consisted essentially of 10-hydroxydecyl diazoacetate.

A portion of the intermediate product (5.63 parts), along with 3-(trimethoxysilyl)propyl isocyanate (4.76 parts) and a few drops of dibutyl tin dichloride were added to benzene (45 parts) and stirred for 5 days under an atmosphere of nitrogen at room temperature. The benzene was then removed under vacuum leaving a yellow oily product. The resulting product was 10-[(3-trimethoxysilylpropyl)carbamoyl]decyl diazoacetate of approximately 81 percent purity as determined by nitrogen evolution.

EXAMPLE 13

This example illustrates the bonding of a polymer to a steel panel by first treating the polymer with an azidosilane compound.

A colloidal suspension of approximately 20–22 percent total solids crystalline polypropylene particles, having an average particle size within the range of 0.02–0.5 micron, in a mixed aliphatic hydrocarbon solvent, having a boiling point of 165°C. to 200°C., was divided into four portions. To each portion of the colloidal suspension was added a different amount of 2-chloro-3-[3-(trimethoxysilyl)propoxy]propyl azidoformate in a methylene chloride solution. Each suspension was mechanically mixed and then used to dip-coat an iron phosphate treated steel panel. Each coated panel was baked at a temperature of 400°F. for 8 minutes and then allowed to cool. The coating on each panel was tested for adherence by scoring with a razor blade and then drawing the edge of a metal coin firmly across the thus scored surface. The adhesion of the coating to the surface was rated as follows:

Poor — the coating strips easily from the substrate
Fair — a major part of the coating is removed but very noticeable resistance to the coin is noted
Good — a minor part of the coating is removed. The coin skips across the coating rather than removing a continuous film.
Excellent — None of the coating is removed.

The results of the test are tabulated below:

| Sample | % of Azidosilane in suspension* | Adhesion |
|---|---|---|
| a | None (control) | poor |
| b | 0.1 | good |
| c | 0.5 | excellent |
| d | 1.0 | excellent |

*percent by weight based on the weight of polypropylene

EXAMPLE 14

This example illustrates the bonding of a polymer to metal panels by first treating the panels with an azidosilane compound.

Metal panels 1 × 4 inches and one-sixteenth inch thick were cleaned and then degreased in trichloroethylene vapor. Each panel, except the untreated controls, was treated by dipping in a solution of 0.02 g/ml of 2-chloro-3-[3-(trimethoxysilyl)propoxy]propyl azidoformate in methylene chloride solution for approximately 5 seconds and immediately dried with a cold air gun. Samples of each polymer were cut into 0.050 inch thick 1 × ½ inch plaques, cleaned and placed between two metal panels so that the panels overlapped approximately ½ inch. Each assembly was molded in a hydraulic press for 5 minutes at an elevated temperature and a pressure of 400 p.s.i. and then cooled in the press to room temperature. In each case the assembly was placed in a jig during the molding to maintain a 0.025 inch glue line. Each sample was then tested for lap shear strength. The metal panels and polymers used, the temperature of the pressure molding and the results of the lap shear strength tests are tabulated below.

| metal panel | polymer | molding temperature °C. | lap shear strength of treated sample p.s.i. | lap shear strength of untreated control p.s.i. |
|---|---|---|---|---|
| aluminum | polypropylene[1] | 250 | 3500 | 290 |
| cold rolled steel | " | " | 1500 | negligible |
| iron phosphate treated steel | " | " | 2000 | negligible |
| aluminum cold rolled | polyethylene[2] | 200 | 2400 | 1600 |
| steel | " | " | 790 | 460 |
| aluminum | polyethylene[3] | 200 | 2400 | 1200 |

[1] Crystalline polypropylene having a specific gravity of 0.904 g./cc. and a melt index (I₂ at 230°C.) of 4.
[2] High density polyethylene having a specific gravity of 0.952 g./cc. and a melt index (I₂ at 190°C.) of 0.6.
[3] High density polyethylene having a specific gravity of 0.945 g./cc.

EXAMPLE 15

This example shows the bonding of polypropylene to metal panels by first treating the panels with an azidosilane compound.

Metal panels 1 × 4 inches and one-sixteenth inch thick were cleaned and then treated with a methylene chloride solution of an azidosilane compound exactly as described in Example 14. The panels were assembled for lap shear strength tests by placing plaques of polypropylene between two panels also as described in Example 14 and molding at a temperature of 230°C. for 5 minutes. The time was used as follows: 3 minutes at contact pressure, 1 minute up to a pressure of 200 p.s.i. and 1 minute at pressure. Each molded sample was then tested for lap shear strength. The metal panels used, the azidosilane compound used and its concentration in the methylene chloride solution and the results of the tests are tabulated below.

| Azidosilane | Concentration g./ml. | Metal Panel | Lap Shear Bond Strength p.s.i. |
|---|---|---|---|
| Sulfonyl azide[1] | 0.005 | Cold Rolled Steel | 130 |
| " | 0.01 | " | 810 |
| " | 0.023 | " | 2400 |
| " | 0.04 | " | 2600 |
| " | 0.005 | Aluminum | 250 |
| " | 0.01 | " | 600 |
| " | 0.04 | " | 1600 |
| 3-(trimethoxysilyl)propyl azidoformate | 0.005 | Cold Rolled Steel | 240 |
| " | 0.04 | " | 1400 |
| " | 0.01 | Aluminum | 980 |
| " | 0.04 | " | 1900 |
| Sulfonyl azide[2] | 0.02 | Cold Rolled Steel | 2000 |

[1] Mixed isomers of (trimethoxysilyl)hexylsulfonyl azide described in Example 7.
[2] Mixed isomers of chlorinated (trimethoxysilyl)amylsulfonyl azide described in Example 6.

EXAMPLE 16

This example shows the bonding of a polypropylene suspension to metal panels by first treating the panels with an azidosilane compound.

The procedure used in this example is similar to that described in Example 14 except the panels were treated by dipping in a 5 percent aqueous methanol solution of 0.02 g/ml of 3-(trimethoxysilyl)propyl azidoformate. Each panel was coated on one side, using a 10 mil drawdown knife, with the colloidal suspension of crystalline polypropylene particles described in Example 13. The coatings were fused at 190°–200°C. for 7 minutes. The resulting films were approximately 0.7–1.0 mil in thickness. Plaques (40 mils thick) of the crystalline polypropylene film described in footnote 1 of Example 14 were placed between the coated panels as described in Example 14 and molded as described in Example 15. The molded samples were then tested for lap shear strength and the results tabulated below:

| Metal | Lap Shear Bond Strength p.s.i. |
|---|---|
| Cold Rolled Steel | 2000 |
| Aluminum | 2300 |

| | Flexural Strength p.s.i. | Flexural Modulus × 10⁶ (p.s.i.) |
|---|---|---|
| Control | 13,740 | 1.65 |
| Treated Sample | 40,590 | 2.24 |

EXAMPLE 17

This example shows the bonding of a polypropylene suspension to metal panels and lap shear bond strength tests where the polypropylene is first mixed with an azidosilane compound.

Samples of the colloidal suspension of crystalline polypropylene particles described in Example 13 were mixed with various amounts of azidosilane in methylene chloride solution.

Metal panels were coated with the polymer suspension and fused as described in Example 16. Then the coated panels were assembled and molded also as described in Example 16. The molded samples were tested for lap shear strength. The metal panels used, the azidosilane compound used and the amount and the results of the tests are tabulated below:

| Azidosilane | Amount, %* | Metal Panel | Lap Shear Bond Strength p.s.i. |
|---|---|---|---|
| 3-(trimethoxysilyl) propyl azidoformate | 0.5 | Aluminum | 1030 |
| " | 1.0 | " | 2000 |
| " | 2.0 | " | 2500 |
| " | 1.0 | Cold Rolled Steel | 760 |
| " | 2.0 | " | 1300 |
| Sulfonyl azide** | 0.5 | Aluminum | 1170 |
| " | 1.0 | " | 1650 |
| " | 2.0 | " | 2140 |
| " | 1.0 | Cold Rolled Steel | 720 |
| " | 2.0 | " | 2250 |

\* Percentage by weight based on the weight of polypropylene
\*\* as described in footnote 1 of Example 15

EXAMPLE 18

This example shows the bonding of polypropylene to glass cloth which has first been treated with an azidosilane compound.

Twelve (12) ply laminates of glass cloth and polypropylene film were prepared using 181 style electrical glass woven cloth, heat cleaned and having a weight of 8.9 ounces per square yard and 5 mil film of crystalline polypropylene. Sheets of the glass cloth were first immersed in a 0.09 g/ml solution of 2-chloro-3[3-(trimethoxysilyl)propoxy]propyl azidoformate in methylene chloride. The thus treated cloth was dried and then laid up to form the laminate by alternating plies of the treated glass cloth and sheets of the polypropylene film. The resulting assembly was compression molded at a temperature of 220°C. for 7 minutes at contact pressure, 3 minutes at a pressure of 440 p.s.i. and then cooled to 23°C. under 440 p.s.i. pressure to form a one-eighth inch thick laminate. A control laminate was prepared exactly as described above except the treatment with the azidosilane was omitted. Test specimens 1 inch by 3 inches were cut from the laminates and tested for flexural strength and flexural modulus according to ASTM D-790 on a 2 inch span at 0.05 inch/minute cross-head speed. The results are tabulated below:

EXAMPLES 19–30

These examples show the bonding of various polymers to glass cloth which have first been treated with an azidosilane compound.

Strips of the glass cloth described in Example 18 were immersed in a 0.5 percent by weight solution of 2-chloro-3[3-(trimethoxysilyl)propoxy]propyl azidoformate in methylene chloride, drained, and hung to dry. The resulting treated glass cloth was used to prepared 12 ply laminates with 12 different polymers as follows:

(19) Strips of the treated glass cloth were immersed in a 12.5 percent by weight solution of polycarbonate resin in methylene chloride. The strips were hung up to dry and then heated in an oven at a temperature of 70°C. to remove the last traces of solvent. The resulting sheets were cut into squares measuring 5⅞ × 5⅞ inches. Twelve plies of the polymer impregnated cloth were assembled for molding.

(20) A twelve ply assembly was prepared exactly as described in 19 except the strips were immersed in a 33 percent by weight solution of acrylonitrile-butadiene styrene molding powder in methylene chloride.

(21) A strip of the treated glass cloth was cut into squares measuring 5⅞ × 5⅞ inches. A laminate was assembled by alternating 12 plies of the glass cloth squares with 13 plies of crystalline polypropylene film 5 mils in thickness.

(22) A laminate was assembled exactly as described in 21 except the polymer was 6 mil polyethylene.

(23) A laminate was assembled exactly as described in 21 except the polymer was 5 mil pressed sheets of polystyrene.

(24) A laminate was assembled exactly as described in 21 except the polymer was 5 mil pressed sheets of polyoxymethylene.

(25) A laminate was assembled exactly as described in 21 except the polymer was 5 mil poly(vinyl chloride) film.

(26) A laminate was assembled exactly as described in 21 except the polymer was 5 mil Nylon film.

(27) A laminate was assembled exactly as described in 21 except the polymer was 6 mil poly(ethylene terephthalate) film.

(28) A laminate was assembled exactly as described in 21 except the polymer was 6 mil poly(ethylene terephthalate—hexahydroterephthalate) film.

(29) A laminate was assembled using 12 squares of the treated glass cloth. Each square measured 5¾ × 5¾ inches and was coated with a hot epoxy resin. The resin was prepared by heating 15 parts of the epoxy resin to 50°C. and adding 1.87 part of m-phenylenediamine. The laminate was assembled on a heated 12 × 12 inch steel plate fitted with a poly(ethylene terephthalate) release sheet. An excess of resin was maintained on the laminate at all times and as each square of cloth was added, a spatula was used to work the trapped air through the cloth. One eighth inch spacer bars were placed on three sides of the laminate and a release sheet placed on top. A second steel plate was placed on the laminate and the entire assembly secured with C-clamps.

(30) A laminate was assembled exactly as described in 29 except the polymer was a styrene-modified polyester resin mixed with 1 part per hundred methyl ethyl ketone peroxide and heated to 60°C.

All thermoplastic laminates were prepared by compression molding in a picture-frame mold having inside dimensions of 6 × 6 × ⅛ inches. Molding conditions are given in Table I.

Control samples were prepared exactly as described above except the glass cloth was not first treated with the azidosilane compound. Samples of the treated and control laminates were tested for flexural strength and modulus according to ASTM D-790 using a 2 inch span, single-point loading, and a crosshead speed of 0.2 inch/minute. Each sample was cut to a size of 1 × 3 × ⅛

TABLE I

| Example number | Polymer | Preheat | | | Molding | | | Cooling |
|---|---|---|---|---|---|---|---|---|
| | | Time, min. | Temp., °C. | Press., p.s.i. | Time, min. | Temp., °C. | Press., p.s.i. | Press., p.s.i. |
| 19 | Polycarbonate [a] | 4 | 250 | Contact | 5 | 250 | 500 | 500 |
| 20 | Acrylonitrile-butadiene-styrene [b] | 7 | 240 | do | 5 | 240 | 350 | 350 |
| 21 | Polypropylene [c] | 7 | 220 | do | 5 | 220 | 400 | 400 |
| 22 | Polyethylene [d] | 6 | 177 | do | 4 | 177 | 400 | 400 |
| 23 | Polystyrene [e] | 6 | 204 | do | 4 | 204 | 340 | 340 |
| 24 | Polyoxymethylene [f] | 4 | 220 | do | 3 | 220 | 340 | 340 |
| 25 | Poly(vinyl chloride) [g] | 15 | 193 | do | 3 | 193 | 440 | 440 |
| 26 | Nylon [h] | 10 | 280 | do | 2 | 280 | 500 | 500 |
| 27 | Poly(ethylene-terephthalate) [i] | 7 | 285 | do | 5 | 285 | 500 | [k] 500 |
| 28 | Poly(ethylene terephthalatehexahydroterephthalate) [j] | 4 | 235 | do | 3 | 235 | 400 | [k] 400 |

[a] Based on 4,4'-dihydroxydiphenyl propane and having a melt index (ASTM D-1238) of 5 g./10 min.
[b] 19% acrylonitrile, 20% butadiene having a melt index (ASTM D-1238) of 16 g./10 min.
[c] Crystalline, having a specific gravity of 0.904 g./cc. and a melt index of 4 g./10 min. ($I_2$ at 230° C.).
[d] High density, having a specific gravity of 0.952 g./cc. and a melt index of 0.6 g./10 min. ($I_2$ at 190° C.).
[e] Atactic polystyrene having a specific gravity of 1.04 g./cc.
[f] Having a specific gravity of 1.42 g./cc.
[g] Rigid, having a number average molecular weight of 140,000.
[h] Poly(hexamethylene adipamide) having a number average molecular weight of 110,000.
[i] Having an intrinsic viscosity of 0.61 and an amorphous specific gravity of 1.34 g./cc.
[j] Having a specific viscosity of 0.85 at 25° C. in a 60/40 solution of phenol and tetrachloroethane and a specific gravity of 1.335 g./cc. after annealing.
[k] Annealed for 2 hours at 135° C. under pressure.

The thermosetting plastic laminates were gelled and cured while clamped between steel plates. The conditions are given in Table II.

inch. Tests were also conducted on most of the samples after boiling in water. The results of the tests are set forth in Table III.

TABLE III

| Example number | Polymer | Treatment of glass cloth | Dry flexural properties | | Boiled in water properties | | |
|---|---|---|---|---|---|---|---|
| | | | Strength, p.s.i. | Modulus, p.s.i.×10⁶ | Hours boiled | Strength, p.s.i. | Modulus, p.s.i.×10⁶ |
| 19 | Polycarbonate | Treated | 52,200 | 2.7 | 72 | 24,000 | 2.2 |
| | | Control | 39,200 | 2.4 | 72 | 21,300 | 2.0 |
| 20 | Acrylonitrile-butadiene-styrene | Treated | 23,300 | 1.6 | 72 | 27,300 | 1.2 |
| | | Control | 18,600 | 2.0 | 72 | 5,800 | 0.4 |
| 21 | Polypropylene | Treated | 38,100 | 2.2 | 72 | 31,000 | 2.1 |
| | | Control | 12,600 | 1.8 | 72 | 8,100 | 1.4 |
| 22 | Polyethylene | Treated | 22,800 | 1.5 | 72 | 20,400 | 1.8 |
| | | Control | 13,200 | 1.2 | 72 | 8,200 | 1.3 |
| 23 | Polystyrene | Treated | 49,100 | 2.4 | 72 | 34,600 | 1.8 |
| | | Control | 35,000 | 3.0 | 72 | 18,200 | 2.0 |
| 24 | Polyoxymethylene | Treated | 42,400 | 2.6 | | | |
| | | Control | 24,500 | 2.2 | | | |
| 25 | Poly(vinyl chloride) | Treated | 32,100 | 2.6 | 72 | 15,600 | 1.8 |
| | | Control | 22,800 | 2.0 | 72 | 9,100 | |
| 26 | Nylon | Treated | 66,600 | 2.8 | 72 | 30,500 | 1.8 |
| | | Control | 43,000 | 2.6 | 72 | 13,500 | 1.4 |
| 27 | Poly(ethylene tetephthalate) | Treated | 47,600 | 2.7 | 12 | 47,100 | 3.0 |
| | | Control | 47,500 | 2.9 | 12 | 18,300 | 2.7 |
| 28 | Poly(ethylene tetephthalatehexahydroterephthalate) | Treated | 46,700 | 2.6 | 12 | 26,500 | 3.0 |
| | | Control | 46,400 | 2.8 | 12 | 12,000 | 2.0 |
| 29 | Epoxy resin | Treated | 67,300 | 2.7 | 72 | 51,200 | 2.8 |
| | | Control | 47,300 | 2.2 | 72 | 36,100 | 2.8 |
| 30 | Polyester resin | Treated | 55,700 | 3.5 | 72 | 35,400 | 3.0 |
| | | Control | 51,800 | 2.6 | 72 | 25,600 | 2.6 |

Table II

| Example No. | Polymer | Gel Conditions | Cure Conditions |
|---|---|---|---|
| 29 | Epoxy resin[a] | 1 hr at 120°C. | 3 hrs at 160°C. |
| 30 | Polyester resin[b] | 3 hrs at 60°C. 2 hrs at 150°C. | 1 hr at 180°C. |

[a] Epoxide resin-diglycidyl ether of bisphenol A having an epoxide equivalent weight of 190.
[b] Styrene-modified bisphenol-type polyester EXAMPLES 31 and 32

These examples show the bonding of polypropylene to samples of glass cloth which have first been treated with an azidosilane compound.

Strips of the glass cloth described in Example 18 were immersed in solution of an azidosilane in methylene chloride, drained and hung to dry. The resulting treated glass cloth was used to prepare 12 ply laminates with crystalline polypropylene film, 5 mils in thickness exactly as described in Example 18. Control samples were prepared in the same manner except the glass cloth was not first treated with an azidosilane compound. Samples were cut from the treated and control laminates and tested for flexural strength and modulus according to ASTM D-790. Tests were also conducted on the samples after boiling in water. The results of the tests are set forth in Table IV.

laminates with crystalline polypropylene film, 5 mils in thickness exactly as described in Example 18. Control samples were prepared in the same manner except the glass cloth was not first treated with an azidosilane compound. Samples were cut from the treated and control laminates and tested for flexural strength and

TABLE IV

| Example Number | Azidosilane | Azidosilane conc. (wt. percent in $CH_2Cl_2$) | Dry flexural properties | | 72 hour boil flexural properties | |
|---|---|---|---|---|---|---|
| | | | Strength, p.s.i. | Modulus, p.s.i.×10⁶ | Strength, p.s.i. | Modulus, p.s.i.×10⁶ |
| Control | | 0 | 12,500 | 1.8 | 8,100 | 1.4 |
| 31 | Sulfonyl azide [1] | 0.125 | 36,100 | 2.5 | 21,100 | 1.8 |
| | | 0.650 | 39,400 | 2.4 | 24,300 | 2.2 |
| | | 0.500 | 45,100 | 2.3 | 24,000 | 2.4 |
| | | 1.00 | 36,400 | 2.0 | 26,300 | 2.4 |
| 32 | 3-(trimethoxysilyl)propyl azidoformate | 0.125 | 35,900 | 2.5 | 28,400 | 2.1 |
| | | 0.250 | 36,200 | 2.5 | 25,600 | 2.2 |
| | | 0.500 | 32,300 | 2.6 | 21,600 | 2.3 |

[1] As described in footnote 2 of Example 15.

EXAMPLE 33

A laminate was prepared exactly as described in Example 32 except the glass cloth was immersed in an aqueous solution of the azidosilane instead of a methylene chloride solution. The aqueous solution was prepared as follows. A methylene chloride solution containing 0.0024 g/ml of 3-(trimethoxysilyl)propyl azidoformate was diluted with equal parts of acetone. The resulting solution was heated to distill off the methylene chloride. A portion of the resulting acetone solution amounting to 33 ml was diluted to a total volume of 200 ml with distilled water. Then the pH of the solution was adjusted to 4 with glacial acetic acid.

A sample of the laminate and a control were tested for flexural strength and modulus as described in Examples 31 and 32. The results of the tests are tabulated below.

| | Dry Flexural Properties | | 72 Hour Boil Flexural Properties | |
|---|---|---|---|---|
| | Strength psi | Modulus psi × 10⁶ | Strength psi | Modulus psi × 10⁶ |
| Control | 12,500 | 1.8 | 8,100 | 1.4 |
| Treated | 21,900 | 2.0 | 18,200 | 1.9 |

EXAMPLES 34 and 35

These examples show the bonding of polypropylene to samples of glass cloth which have first been trated with an azidosilane compound.

Strips of the glass cloth described in Example 18 were immersed in benzene or methylene chloride solutions of an azidosilane, drained and hung to dry. The resulting treated glass cloth was used to prepare 12 ply laminates with crystalline polypropylene film, 5 mils in thickness exactly as described in Example 18. Control samples were prepared in the same manner except the glass cloth was not first treated with an azidosilane compound. Samples were cut from the treated and control laminates and tested for flexural strength and modulus according to ASTM D-790. Tests were also conducted on the samples after boiling in water for 72 hours. The results of the tests are set forth in Table V.

TABLE V

| Example percent | Azidosilane | Azidosilane conc. (wt. percent) in solvent | Solvent | Dry flexural properties | | 72 hour boil flexural properties | |
|---|---|---|---|---|---|---|---|
| | | | | Strength p.s.i. | Modulus, p.s.i.×10⁶ | Strength, p.s.i. | Modulus p.s.i.×10⁶ |
| Control | None | 0 | | 13,300 | 1.7 | 9,800 | 1.4 |
| 34 | Sulfonyl azide [1] | 0.06 | Benzene | 23,500 | 2.3 | 18,100 | 2.1 |
| | | 0.125 | do | 29,600 | 2.1 | 28,500 | 2.3 |
| | | 0.25 | do | 35,700 | 2.3 | 27,400 | 2.1 |
| | | 0.5 | do | 31,200 | 2.1 | 24,100 | 2.1 |
| 35 | Sulfonyl azide [2] | 0.03 | Methylene chloride | 27,200 | 2.4 | 19,200 | 2.3 |
| | | 0.06 | do | 39,900 | 2.7 | 27,200 | 2.6 |
| | | 0.125 | do | 40,000 | 2.5 | 31,000 | 2.5 |
| | | 0.5 | do | 42,000 | 2.4 | 24,500 | 2.5 |

[1] Mixed isomers of (trimethoxysilyl)cyclohexylsulfonyl azide.
[2] As described in footnote 1 of Example 15.

EXAMPLE 36

This example shows the bonding of a mixture of polypropylene and poly(vinyl acetate) to samples of glass cloth by treating the said cloth with an aqueous sizing system containing an azidosilane and a dispersion of the polymers.

Strips of the glass cloth described in Example 6 were immersed in an aqueous dispersion prepared follows: To 200 parts of water containing a small amount of alkylphenoxy poly(ethyleneoxy ethanol) nonionic Surfactact was added with vigorous agitation 10 parts (based on the solids) of an aqueous dispersion of polyvinyl acetate) having a Brookfield viscosity of 10 poises at 25°C. and a pH of 5.0. Then 10 parts of crystalline polypropylene particles, having an average particle size within the range of 0.02–0.5 micron, and 1 part of the mixed isomers of (trimethoxysilyl)hexylsulfonyl azide described in Example 7 were added with continued agitation. After immersion, the strips were hung up to dry and then cut into 5¾ inch squares for lamination. Twelve squares of the sized sheet were alternately laid up with 5 mil sheets of crystalline polypropylene and compression molded at a temperature of 220°C. for 7 minutes at contact pressure, 3 minutes at a pressure of 440 p.s.i. and then cooled to 23°C. under 440 p.s.i. pressure. Test specimens were cut from the laminates and tested for flexural strength and modulus according to ASTM D-790. Tests were also conducted on the samples after boiling in water for 72 hours. The results of the tests are tabulated below.

| Sample | Grams of azido- silane in sizing dispersion | Dry flexural properties | | 72 hour boil flexural properties | | Percent strength retention |
|---|---|---|---|---|---|---|
| | | Strength, p.s.i. | Modulus p.s.i. ×10⁶ | Strength, p.s.i. | Modulus, p.s.i. ×10⁶ | |
| a | 0.125 | 35,800 | 2.2 | 23,900 | 1.9 | 66 |
| b | 0.25 | 27,800 | 1.8 | 21,500 | 1.9 | 77 |
| c | 0.50 | 37,700 | 1.9 | 26,100 | 1.9 | 69 |

EXAMPLES 37-39

These examples show the bonding of various polymers to glass cloth by first treating the polymers with an azidosilane.

In each example, 15 parts by weight of polymer was added to approximately 1,300 parts by weight of dry tetrachloroethylene. A methylene chloride solution of 0.67 parts by weight of 3-(trimethoxysilyl)propyl azidoformate was then added and the whole heated to 120°C. with stirring. After 90 minutes the solution was cooled to 90°C. and 1 part by weight of water added to promote silane hydrolysis. Strips of the glass cloth described in Example 18 were immersed for 10 minutes in the hot solution, hung in a hood for 15 minutes and then dried for 16 hours at 80°C. in a vacuum oven. The dried strips were cut into 5¾ inch squares. The thus coated cloth squares were laid up to form the laminates by alternating plies of the cloth and 5 mil sheets of the polymer. In each case the laminate contained 12 plies of glass cloth. All laminates were prepared by compression molding in a picture-frame mold having inside dimensions of 6 × 6 × ⅛ inches. The molding conditions used for each polymer were as described in Table I.

Control samples were prepared exactly as described above except the polymers were not first treated with the azidosilane. Samples of the treated and control laminates were tested for flexural strength and modulus according to ASTM D-790. The same tests were also conducted on samples after boiling in water. The results of these tests are set forth in Table VI.

Strips of the glass cloth described in Example 18 were immersed in various concentrations of 10-[3-(trimethoxysilylpropyl)-carbamoyl] decyl diazoacetate in methylene chloride solution, drained, and hung to dry. The resulting treated glass cloth was used to prepare 12 ply laminates with crystalline polypropylene film, 5 mils in thickness exactly as described in Example 18. A control sample was prepared in the same manner except the glass cloth was not first treated with the diazoacetate silane compound. Samples were cut from the treated and control laminates and tested for flexural strength and modulus according to ASTM D-790. Tests were also conducted on the samples after boiling in water. The results of the tests are set forth in Table VII.

TABLE VII

| Sample | Diazo- acetate silane compound conc. (wt. percent) in CH₂Cl₂ | Dry flexural properties | | 72 hour boil flexural properties | | Percent strength retention |
|---|---|---|---|---|---|---|
| | | Strength, p.s.i. | Modulus, p.s.i.×10⁶ | Strength, p.s.i. | Modulus, p.s.i.×10⁶ | |
| a | 0.500 | 25,200 | 1.9 | 23,400 | 1.9 | 92.7 |
| b | 0.250 | 33,500 | 2.1 | 23,900 | 2.1 | 71.5 |
| c | 0.125 | 33,300 | 2.1 | 27,400 | 2.2 | 82.1 |
| Control | None | 12,500 | 1.8 | 8,100 | 1.4 | 64.7 |

EXAMPLE 41

This example shows the bonding of polypropylene to samples of glass cloth which have first been treated with an azidosilane compound.

Strips of the glass cloth described in Example 18 were immersed in a 0.125 percent by weight solution of mixed isomers of 2-(trimethoxysilyl)ethylbenzenesulfonyl azide in benzene, drained, and hung to dry. The resulting treated glass cloth was used to prepare 12 ply laminates with crystalline polypropylene film, 5 mils in thickness exactly as described in Example 18. Control samples were prepared in the same manner except the glass cloth was not first treated with an azidosilane compound. Samples were cut from the treated and control laminates and tested for flexural strength and modulus according to ASTM D-790 as described in Examples 31 and 32. The results of the tests are tabulated below:

| | Dry Flexural Properties | | 72 Hour Boil Flexural Properties | |
|---|---|---|---|---|
| | Strength psi | Modulus psi ×10⁶ | Strength psi | Modulus psi × 10⁶ |
| Control | 12,500 | 1.8 | 8,100 | 1.4 |
| Treated | 37,200 | 2.4 | 32,100 | 2.1 |

TABLE VI

| Example number | Polymer | Treatment of polymer | Dry flexural properties | | Properties after boiling in water | | |
|---|---|---|---|---|---|---|---|
| | | | Strength, p.s.i. | Modulus, p.s.i. ×10⁶ | Hours boiled | Strength, p.s.i. | Modulus, p.s.i. ×10⁶ |
| 37 | Polypropylene ¹ | Treated | 36,900 | 2.5 | 72 | 23,600 | 2.3 |
| | | Control | 12,500 | 1.8 | 72 | 8,100 | 1.4 |
| 38 | Polyethylene ² | Treated | 12,600 | 2.1 | 72 | 15,100 | 1.6 |
| | | Control | 13,200 | 1.2 | 72 | 8,200 | 1.3 |
| 39 | Poly(ethylene terephthalatehexahydroterephthalate) ³ | Treated | 49,400 | 3.1 | 24 | 15,600 | 2.3 |
| | | Control | 46,400 | 2.8 | 24 | 12,000 | 2.0 |

¹ Crystalline, having a specific gravity of 0.904 g./cc. and a melt index of 4 g./10 min. (I₂ at 230° C.).
² High density, having a specific gravity of 0.952 g./cc. and a melt index of 0.6 g./10 min. (I₂ at 190° C.).
³ Prepared using 30 mole of dimethylhexahydroterephthalate and having a specific viscosity 0.85 at 25° C. in a 60/40 solution of phenol and tetrachloroethane.

EXAMPLE 40

This example shows the bonding of polypropylene to samples of glass cloth which have first been treated with a diazoacetate silane compound.

EXAMPLE 42

This example shows the bonding of polypropylene to samples of glass cloth which have first been treated with an aqueous solution of an azidosilane compound.

Strips of the glass cloth described in Example 18 were immersed in a 0.25 percent by weight aqueous solution of 3-(trimethoxysilyl)propylsulfonyl azide, drained, and hung to dry. The aqueous solution had been prepared by adding the sulfonylazide to water at a pH of 7. The resulting treated glass cloth was used to prepare laminates and tested exactly as described in Example 41. The results of the tests are tabulated below:

|  | Dry Flexural Properties | | 72 Hour Boil Flexural Properties | |
|---|---|---|---|---|
|  | Strength psi | Modulus psi × 10⁶ | Strength psi | Modulus psi × 10⁶ |
| Control | 12,500 | 1.8 | 8,100 | 1.4 |
| Treated | 38,150 | 2.2 | 21,000 | 1.8 |

EXAMPLE 43

This example shows the bonding of polypropylene to samples of glass cloth which have first been treated with an azidosilane compound.

Strips of the glass cloth described in Example 18 were immersed in a 0.06 percent by weight solution of N-3-(triethoxysilyl)propyl-N'-3-azidosulfonylphenylurea in benzene, drained, and hung to dry. The resulting treated glass cloth was used to prepare laminates and tested exactly as described in Example 41. The results of the tests are tabulated below:

|  | Dry Flexural Properties | | 72 Hour Boil Flexural Properties | |
|---|---|---|---|---|
|  | Strength psi | Modulus psi × 10⁶ | Strength psi | Modulus psi × 10⁶ |
| Control | 12,500 | 1.8 | 8,100 | 1.4 |
| Treated | 36,500 | 2.0 | 25,800 | 1.8 |

EXAMPLE 44

This example shows the bonding of polypropylene to samples of asbestos felt which have first been treated with a diazosilane compound.

Laminates of asbestos felt and polypropylene film were prepared using chrysotile asbestos felts, 10 mils in thickness (99 percent asbestos) and 10 mil film of the crystalline polypropylene described in Example 18. The felts were first immersed in a 0.77 percent by weight solution of 3-(trimethoxysilyl)propyl α-diazo-α-carboethoxy acetate in methylene chloride. The thus treated felts were dried and then laid up to form the laminate by alternating plies of the treated asbestos felt and sheets of the polypropylene film. The resulting assembly was compression molded at a temperature of 220°C. for 7 minutes at contact pressure, 3 minutes at a pressure of 440 p.s.i. and then cooled to 23°C. under 440 p.s.i. pressure to form a ⅛ inch thick laminate. A control laminate was prepared exactly as described above except the treatment with the diazosilane was omitted. Samples were cut from the treated and control laminates and tested for flexural strength and modulus according to ASTM D-790. The results of the tests are tabulated below:

|  | Flexural Strength psi | Flexural Modulus × 10⁶ (psi) |
|---|---|---|
| Control | 15,900 | 0.9 |
| Treated | 18,900 | 1.0 |

EXAMPLE 45

This example shows the bonding of polypropylene to samples of asbestos felt which have first been treated with an azidosilane compound.

Strips of the asbestos felt described in Example 44 were immersed in a 0.4 percent by weight solution of 3-(trimethoxysilyl)-propylsulfonyl azide in methylene chloride and dried. The resulting treated felt was used to prepare laminates with crystalline polypropylene and tested exactly as described in Example 44. The results of the tests are tabulated below:

|  | Flexural Strength psi | Flexural Modulus × 10⁶ (psi) |
|---|---|---|
| Control | 15,900 | 0.9 |
| Treated | 19,500 | 1.1 |

EXAMPLE 46

This example shows the bonding of polypropylene to samples of glass cloth which have first been treated with a diazosilane compound.

Strips of the glass cloth described in Example 18 were immersed in various concentrations of 3-(trimethoxysilyl)propyl α-diazo-α-carboethoxy acetate in methylene chloride, drained, and dried. The resulting treated glass cloth was used to prepare 12 ply laminates with crystalline polypropylene film, 5 mils in thickness, exactly as described in EXample 18 and tested also as described in Example 18. The results of the tests are set forth in Table VIII.

TABLE VIII

| sample | diazosilane conc. (wt. %) in $CH_2Cl_2$ | dry flexural properties | | 72 hour boil flexural properties | |
|---|---|---|---|---|---|
|  |  | strength psi | modulus psi × 10⁶ | strength psi | modulus psi × 10⁶ |
| control | None | 13,300 | 1.7 | 8,900 | 1.2 |
| a | 0.062 | 24,000 | 1.8 | 12,200 | 1.7 |
| b | 0.125 | 26,900 | 1.9 | 15,200 | 1.7 |
| c | 0.25 | 25,200 | 1.8 | 16,700 | 1.7 |
| d | 0.50 | 30,200 | 2.1 | 17,500 | 1.9 |

EXAMPLE 47

This example shows the bonding of polypropylene to samples of glass cloth which have first been treated with a diazosilane compound.

The procedure used in this example is the same as that described in Example 46 except the glass cloth was immersed in a 0.25 percent by weight dispersion of the diazosilane compound in water at a pH of 4-5. The resulting laminates were treated as described in Example 18. The results of the tests are tabulated below:

|  | Dry Flexural Properties | | 72 Hour Boil Flexural Properties | |
|---|---|---|---|---|
|  | Strength psi | Modulus psi × 10⁶ | Strength psi | Modulus psi × 10⁶ |
| Control | 13,300 | 1.7 | 8,900 | 1.2 |
| Treated | 20,800 | 1.9 | 13,300 | 1.7 |

EXAMPLE 48

This example shows the bonding of polyester tire cord to rubber tire stock using an azidosilane compound.

Poly(ethylene terephthalate) tire cord 1,000 denier and 3 ply, under about 500 grams of tension was passed twice through a trough containing a 5 percent solution of 3-(trimethoxysilyl)-propyl azidoformate in a mixed trichloroethylene-methylene chloride solvent. The cord was next passed through two ovens in series at 200° and 400°F. Residence times in the ovens was 65 and 54 seconds respectively. The cord dip pick-up wt. approximately 1.4 percent by weight.

The modified cord was next dipped in a resin latex prepared as follows. To a solution of 0.24 part of sodium hydroxide in 192.8 parts of water was added 8.8 parts of resorcinol with continued stirring until a complete solution was achieved. Then 12.2 parts of 37 percent formaldehyde was added. The solution was aged for approximately 5 hours at about 75°C. and then added slowly to a mixture of 48 parts water and 195 parts of a commercial latex, comprising a 41 percent solids terpolymer of styrene, butadiene and vinylpyridine. The monomers being present in a ratio of approximately 15:70:15. The mixture was stirred slowly for 15 minutes and its pH adjusted to 10.3 using concentrated ammonium hydroxide. The resulting gray-violet latex contained approximately 20 percent solids. The azidosilane treated cord was passed twice through a trough of the above described tire cord coating under a tension of 500 grams and then dried and cured for 54 seconds at a temperature of 430°F.

The thus coated cord was then embedded in a vulcanizable rubber tire stock and cured in the form of 154 inch H-specimens. The rubber tire stock had the following formulation.

| Compounds | Parts |
|---|---|
| Natural rubber (smoked sheet) | 80 |
| Styrene-butadiene rubber | 20 |
| Semi-reinforcing furnace black | 25 |
| Zinc oxide | 5 |
| Stearic acid | 2 |
| Polytrimethyl dihydroquinoline | 1 |
| Heavy pine tar | 0.5 |
| Benzothiazoyl disulfide | 1 |
| Tetramethyl thiuram disulfide | 0.1 |
| Sulfur | 2.6 |

The test specimens were cured for 45 minutes at a temperature of 307°F. After several hours conditioning at room temperature the H-specimens were tested according to the procedure of ASTM D-2138-62T. An average (6 test specimens) of 29 pounds was required to overcome the tire-cord rubber adhesion. A control specimen treated exactly the same as above except for the azidosilane treatment gave an average of 17 pounds required to overcome the tire cord-rubber adhesion. A specimen treated with the azidosilane as described above but not treated with the resorcinol-formaldehyde latex dip gave an average value between that reported for the test specimens and that reported for the control specimens.

EXAMPLE 49

Glass tire cord was bonded to rubber tire stock exactly as described in Example 48 with the exception of heating the cord after it had been passed twice through the trough containing the solution of 3-(trimethoxysilyl)propyl azidoformate. The test specimens were tested as described in Example 48 and found to require substantially more force to overcome the tire cord-rubber adhesion then was required in the case of control specimens not treated with the azidosilane.

EXAMPLE 50

This example shows the bonding of polyester fabric to silicone rubber using an azidosilane compound.

Woven poly(ethylene terephthalate) fabric weighing 4 ounces per square yard was dipped into a 24 percent solution of 2-chloro3-[3-(trimethoxysilyl)propoxy] propyl azidoformate in methylene chloride, air dried, and then baked in an air oven for 1 hour at a temperature of 150°C. The thus treated fabric was plyed with 0.04 inch sheets of silica filled, vinyl substituted silicon rubber, containing 0.5 percent by weight of benzoyl peroxide, forming a sandwich-like structure having polyester fabric on the top and bottom with two sheets of silicon rubber in between. The resulting structure was placed in a rubber press, equipped with spacers to hold the plates 0.072 inch apart. The structure was then cured for 45 minutes under pressure at a temperature of 110°F. The resulting laminate was tested to determine the force required to separate the fabric from the rubber. In T-peel tests carried out at 2 inches per minute the rubber failed rather than separating from the fabric (requiring a load of 45 lbs./in ). A control sample not treated with the azidosilane separated from the rubber at about 6 lbs./in.

EXAMPLE 51

This example shows the bonding of polyester fabric to silicone rubber using an azidosilane compound.

Woven poly(ethylene terephthalate) fabric weighing 4 ounces per square yard was dipped into a 22 percent solution of 2-(trimethoxysilyl)ethylbenzenesulfonyl azide in methylene chloride, air dried, and then baked in an air oven for 1 hour at a temperature of 177°C. The fabric was then dipped into a 5 percent solution of vinyltriethoxysilane in tetrachloroethylene, air dried, and baked in an air oven for 20 minutes at a temperature of 150°F. The thus treated fabric was plyed with 0.04 inch sheets of silica filled vinyl substituted silicon rubber, containing 0.5 percent by weight of benzoyl peroxide, forming a sandwich-like structure, cured and tested as described in Example 50. In T-peel tests the rubber failed rather than separating from the fabric. A control sample not treated with the azidosilane separated from the rubber at about 6 lbs./in.

EXAMPLE 52

This example shows the use of an azidosilane compound to improve the physical properties of glass bead filled polypropylene.

Glass beads ranging in size from about 6 to 44 microns and having a specific gravity of 2.48 grams/cc were dipped into a methanol solution of 2-(trimethoxysilyl)ethylbenzenesulfonyl azide. The beads were dried, leaving about 0.2 percent by weight pick-up of azidosilane compound. The thus treated beads were dry blended in a mill with crystalline polypropylene having a melt index ($I_2$ at 230°C.) of 14 g., in a ratio of 30 parts of beads to 70 parts of polymer by weight. The mixture was then screw injection-molded to form test specimens ½ by ⅛ by 5 inches in size. Zone 1 of the injection molding machine was maintained at 440°F., Zone 2 at 460°F., the nozzle at 470°F., and the mold was heated to 120°F. The resulting test specimens had a 30 percent higher flexural modulus at 1 percent strain and 15 percent flexural strength after exposure to boiling water for 72 hours then control moldings made the same way using untreated glass beads.

EXAMPLE 53

This example shows the use of an azidosilane compound to size glass rovings.

An aqueous solution of 0.5 percent by weight 2-(trimethoxysilyl)ethylbenzenesulfonyl azide and 0.25 percent by weight water soluble epoxy resin, having an epoxide equivalent weight of 117, was applied to continuous rovings of electrical glass fibers as they were formed at the glass drawing bushing. The thus sized rovings were taken up on a spool, baked for 40 minutes at a temperature of 100°C., and then chopped into ¼ inch lengths. The chopped rovings were blended with the crystalline polypropylene described in Example 52 to provide a glass level of 30 percent by weight. The mixture was feed into a reciprocating screw injection molding machine maintained at 440°F. in zone 1, 460°F. in zone 2, 470°F. at the nozzle and the mold heated to 120°F. The ½ by ⅛ by 5 inch specimens were tested and found to have a flexural strength of 15,000 p.s.i. Control specimens, not treated with the azidosilane compound had a flexural strength of 9,000 p.s.i. In addition to the difference in strength the treated rovings were much easier to handle in that they maintained their integrity to a much greater extent than the untreated rovings.

EXAMPLES 54 and 55

These examples show the bonding of polymers to glass cloth which has been treated with an azidosilane compound.

Strips of the glass cloth described in Example 18 were immersed in a 0.37 percent by weight solution of 2-(trimethoxysilyl)ethylbenzenesulfonyl azide in methylene chloride, drained, and hung to dry. The resulting treated glass cloth was used to prepare 12 ply laminates with 2 different polymers as described in Example 18. Control samples were prepared exactly as described above except the glass cloth was not first treated with the azidosilane compound. Samples of the treated and control laminates were tested as described in Examples 19-30. The polymers used and the results of the tests are tabulated below:

| example | polymer | dry flexural properties strength psi | modulus psi × 10⁶ | 72 hour boil flexural properties strength psi | modulus psi × 10⁶ |
|---|---|---|---|---|---|
| 54 | polyethylene⁽¹⁾ | 35,500 | 2.2 | 28,400 | 2.2 |
| control | | 11,900 | 1.5 | 7,400 | 0.8 |
| 55 | polybutene-1⁽²⁾ | 24,150 | 1.6 | 10,600 | 1.2 |
| control | | 11,000 | 1.5 | 7,000 | 1.0 |

⁽¹⁾ High density, having a specific gravity of 0.952 g./cc. and a melt index of 4.6 g/10 min. (I₂ at 190°C.)

⁽²⁾ Isotactic-sold under the trade name "Vestolen BT-1711."

I claim:

1. A nitrogen containing silane compound having the formula

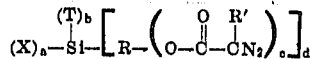

where R is selected from the group consisting of alkylene, cycloalkylene, alkylene substituted cycloalkylene, arylene, alkylene substituted arylene, alkylene diarylene, alkylene-oxy-alkylene, arylene-oxy-arylene, alkylenearylene-oxy-arylene, alkylenearylene-oxy-alkylenearylene, arylenealkylene-oxy-alkylene, arylenealkylene-oxy-arylenealkylene, alkylene-thio-alkylene, arylene-thio-arylene, arylenealkylene-thio-arylenealkylene, alkylene-sulfonyl-alkylene, arylene-sulfonyl-arylene, alkylenearylene-sulfonyl-arylene, alkylenearylene-sulfonyl-alkylenearylene, arylenealkylene-sulfonyl-alkylene, arylenealkylene-sulfonyl-arylenealkylene, and the corresponding halogenated radicals; X is a radical selected from the group consisting of halo, hydroxy, alkoxy, aryloxy, $-N_3$, $-NH_2$, alkyl substituted amine, amide and organo oxycarbonyl radicals selected from alkyl oxycarbonyl, cycloalkyl oxycarbonyl and aryl oxycarbonyl radicals; T is a radical selected from the group consisting of alkyl, cycloalkyl, aryl, alkaryl, and aralkyl radicals; $a$ is an integer from 1 to 3; $b$ is an integer from 0 to 2; $c$ is an integer from 1 to 10; $d$ is an integer from 1 to 3; and $a+b+d$ equals 4; R' is a radical selected from the group consisting of hydrogen, alkyl, cycloalkyl, aryl and -COOR'' radicals; where R'' is a radical selected from the group consisting of alkyl, cycloalkyl and aryl radicals; wherein the said arylene and aryl radicals are carbocyclic arylenes and aryls, respectively, containing six to 18 carbon atoms, the said alkylene and alkyl radicals contain one to 20 carbon atoms and the said cycloalkylene and cycloalkyl radicals contain three to 20 carbon atoms.

2. 3-(Trimethoxysilyl)propyl α-diazo-α-carboethoxy acetate.

* * * * *